(12) United States Patent
Ogilvie

(10) Patent No.: US 6,324,650 B1
(45) Date of Patent: Nov. 27, 2001

(54) MESSAGE CONTENT PROTECTION AND CONDITIONAL DISCLOSURE

(76) Inventor: John W.L. Ogilvie, 1211 E. Yale Ave., Salt Lake City, UT (US) 84105

( * ) Notice: Subject to any disclaimer, the term of this patent is extended or adjusted under 35 U.S.C. 154(b) by 0 days.

(21) Appl. No.: 09/184,206

(22) Filed: Nov. 2, 1998

Related U.S. Application Data

(60) Provisional application No. 60/078,175, filed on Mar. 16, 1998.

(51) Int. Cl.⁷ .................................................. G06F 12/14
(52) U.S. Cl. ............................................................ 713/202
(58) Field of Search ..................... 713/200, 201, 713/202, 163, 164, 168, 170, 171, 176; 709/229; 705/51, 52, 53, 54, 57, 58; 380/201, 202, 203

(56) References Cited

U.S. PATENT DOCUMENTS

| | | | |
|---|---|---|---|
| 5,390,247 | 2/1995 | Fischer | 380/25 |
| 5,426,281 | 6/1995 | Abecassis | 235/379 |
| 5,428,778 | 6/1995 | Brookes | 395/600 |
| 5,436,972 | 7/1995 | Fischer | 380/25 |
| 5,537,533 | 7/1996 | Staheli et al. | 395/182.03 |
| 5,557,346 | 9/1996 | Lipner et al. | 380/21 |
| 5,630,057 | 5/1997 | Hait | 395/186 |
| 5,659,614 | 8/1997 | Bailey, III | 380/4 |
| 5,745,573 | * 4/1998 | Lipner et al. | 380/21 |
| 5,748,744 | * 5/1998 | Levy et al. | 380/25 |
| 5,748,960 | 5/1998 | Fischer | 395/683 |
| 5,812,398 | * 9/1998 | Nielsen | 713/201 |
| 5,956,403 | * 9/1999 | Lipner et al. | 380/21 |

FOREIGN PATENT DOCUMENTS

0715246A1 * 6/1996 (EP) .

OTHER PUBLICATIONS

International Preliminary Examination Report, PCT/US98/23841, Nov. 28, 2000.
Isaacs, "Re: .pix extension", May 5, 1997.
Andrew S. Tanenbaum, "Computer Networks—Third Edition", *Prentice Hall PTR*, (1996), pp. 622–630.
Ross J. Anderson, "The Eternity Service", *Computer Based Learning Unit, University of Leeds*, (Jun. 17, 1997), pp. 1–22.
"Fort Knox Escrow Services, Inc.", (no later than Oct. 22, 1998), pp. 1–2.
"Four Atypical Uses for Escrow", *DSI*, (1995), pp. 1–3.
"Oops. In Cyberspace, News Often Jumps the Gun", *The Wall Street Journal*, (Nov. 6, 1998), p. 1.
"SystemsMgmt.com—Are you Prepared?", *Miller Freeman, Inc.*, (1998), pp. 1–5.
Joshua R. Smith and Barrett Comiskey, "PixelTag—MIT Media Lab", (No later than Dec. 14, 1998), pp. 1–2.
John Christopher, "Protect Marks with Web Site Escrow", (No later than Dec. 17, 1998), pp. 1–2.
Ross Anderson, "My Interests Include", (No later than Dec. 10, 1998), p. 1–9.

(List continued on next page.)

*Primary Examiner*—James P. Trammell
*Assistant Examiner*—Pierre E. Elisca
(74) *Attorney, Agent, or Firm*—Computer Law ++

(57) ABSTRACT

Methods and systems are provided for controlling the disclosure of sensitive information. Disclosure is controlled in the sense that (a) the information is not disclosed until predefined conditions are met, such as the passage of a certain time without an authorized update request for secrecy, (b) copies of the information are protected by encryption and by widespread, unpredictable storage, so that at least one copy will be available when disclosure is required, (c) the information is kept secret until disclosure is required, and (d) when disclosure is required, the information is sent to predefined destinations such as email addresses or posted to web sites, in a predefined format.

27 Claims, 4 Drawing Sheets

OTHER PUBLICATIONS

"TradeSafe Online Corporation", *TradeSafe Online Corporation*, (1995–1998), pp. 1–3.

"Steganography Info and Archive", *Eric Milbrandt*, (1997, 1998), pp. 1–7.

"The Web Robots FAQ", (No later than Aug. 19, 1998), pp. 1–6.

"WEPIN Store", *West El Paso Information Network*, (1995), pp. 1–2.

I.H. Cooper, "What tools are currently available?", (No later than Nov. 13, 1997), pp. 1–2.

Martijn Koster, "Guidelines for Robot Writers", (1993), pp. 1–3.

"You Make the Protocol", *Wired*, (Oct. 1997), p. 1.

"EscrowTech", pp. 1–14, copyright date 1996–1999.

Supplemental European Search Report, EP 98957718 from PCT/US98/23841, Mar. 13, 2001.

PCT Published Application WO 96/24092 published Aug. 8, 1996.

European Published Application EP 0715246A1 published May 6, 1996.

PCT Published Application WO 98/03904 published Jan. 29, 1998.

* cited by examiner

MESSAGE CONTENT PROTECTION AND CONDITIONAL DISCLOSURE

RELATED APPLICATIONS

The present application claims the benefit of commonly owned copending U.S. patent application Ser. No. 60/078,175 filed Mar. 16, 1998, which is incorporated herein by this reference.

FIELD OF THE INVENTION

The present invention relates to the use of computer networks to both protect message contents by keeping them secret until a specified condition occurs and to disclose the message contents in a specified manner if the condition occurs. More particularly, the invention relates to information escrow using computer networks, encryption, replication, network traversal, and other tools and techniques.

TECHNICAL BACKGROUND OF THE INVENTION

It is sometimes very important to keep certain information secret unless a particular person dies or becomes otherwise incapacitated, in which case the information should be disclosed in a specified way. More generally, it would often be useful to keep information secret until certain conditions occur, and to then disclose the information in a particular way.

Many situations illustrate the need for carefully controlled disclosure of sensitive information. For example, consider wills and other statements made in contemplation of one's death. The contents of a will are often kept secret from most of the people identified in the will until the person who made the will dies. Then, and only then, is the will disclosed to the people and the institutions who are (or are not) beneficiaries under the will.

As another example, consider information discovered by a potential whistle-blower or other witness to some wrongful act or plot. If the wrongdoing is not promptly reported to the proper authorities, a wrongdoer may believe that all of the incriminating evidence can be destroyed, and may attempt to do so, regardless of the harm inflicted on witnesses and others, including innocent bystanders. Evidence is sometimes lost because a witness is reluctant to tell others because the evidence would implicate the witness in lesser but nonetheless serious violations, because the evidence raises questions but is not conclusive evidence of a crime, or because the witness does not wish to place anyone else at risk. Thus, it would be helpful to provide a reliable way for a witness to preserve a description of events (and possibly other information as well), without directly involving another person until disclosure of the information becomes necessary.

Less dramatic but nonetheless important situations calling for carefully controlled disclosure also arise in other contexts. For instance, a software company which licenses only object code versions of its proprietary software may agree to make the corresponding source code versions available to a licensee if the software company goes bankrupt or discontinues support, or if some other stated condition occurs. The source code should be disclosed, but it should be disclosed only to the licensee and only when the stated conditions occur.

As another example, consider the address databases that correlate domain names with IP addresses on the web, password databases, digital certificate databases, marketing databases that correlate email addresses with names and other demographic information, bank account databases, and the many other databases that support electronic commerce. An illicit copy of such a database could be put to many unauthorized purposes, so backup copies should be stored securely. On the other hand, authorized system personnel should have ready access to a copy if necessary to restore operation of the system.

Accordingly, mirroring servers, compressed archives, and other backup tools and techniques are used to create frequent backups and to disperse them geographically to reduce the risk of losing the data. Physical security methods ranging from locked doors to dismounted magnetic tapes to watchdogs are also used, to make sure the backup is available only to authorized system administrators.

More generally, current approaches to controlled disclosure of sensitive information often involve asking someone to act as a guardian of the information. The guardian role may be filled by a coworker, friend, relative, spouse, attorney, journalist, escrow agent, or other person. The guardian is asked to receive the information, to hold it in strict secrecy until some stated condition occurs (typically death, bankruptcy, data loss, or other incapacitation), and to then disclose the information to one or more persons who have previously been identified or described by the person who places the information in the guardian's care.

Unfortunately, present guardianship approaches are vulnerable to natural disasters, wars, terrorist attacks, or even more mundane problems such as record-keeping errors or satellite failures. Such events may destroy all copies of the information. They may also make the copies difficult or impossible to locate, or result in premature or misdirected disclosure of the information.

Guardianship may also fail in other ways. Even if a guardian has the best of intentions, the guardian's copy of the information may be lost or destroyed despite the guardian's efforts. If the information is sufficiently valuable and is perceived to be vulnerable, then the guardian may be the target of extreme efforts, either to prevent disclosure of the information or to obtain unauthorized access to the information. Moreover, approaches which rely on professional escrow agents or attorneys as guardians tend to be relatively expensive, inconvenient, or both.

Modern computer technology provides many tools for managing information, so it is reasonable to ask whether some form of automation might help guardians. However, the diversity of techniques and devices available makes it difficult to determine which tools and techniques are relevant to the problem at hand. To give but a few examples of the available technologies: user interfaces make it easier to control software and hardware; hardware advances make it possible to create ever more complex and adaptable systems; networks (both wired and wireless) connect computers at different locations with different levels of security; platform-independent libraries and languages help make functionally compatible software available throughout a network; visualization tools help present information to viewers in meaningful ways; databases organize information in a way that promotes analysis of the information and provides access to the information; web crawlers create indexes which help locate information; artificial intelligence techniques help process information; identification, authentication, and encryption methods help keep information secret from unauthorized viewers and/or detect tampering; fault-tolerant systems, replication methods, and archival techniques each provide some assurance that another copy of critical data will be available if a given server or link goes down; programming languages and other development tools encourage experimentation and rapid development of prototype computer systems; and tools and economic incentives promote the commercialization and adoption of new computer software and hardware products. The difficulty lies in determining which techniques are useful for controlling disclosure, and how to adapt or combine them for such use.

In short, it would be an advancement to provide an approach which draws on relevant computer technology tools and techniques and combines or develops them in new ways to improve control over the disclosure of sensitive information.

Such an approach is disclosed and claimed herein.

BRIEF SUMMARY OF THE INVENTION

The present invention relates to methods, articles, signals, and systems for controlling the disclosure of sensitive information. Because the invention could be used in so many different situations, information is considered "sensitive" if an information provider chooses to use the invention to control its disclosure. The invention hides copies of sensitive information in networks to prevent destruction of every copy, and discloses the information in a specified way if specified conditions occur. Metaphorically, the invention provides a "hidden choir" which will sing when desired and otherwise remain silently ready in the background.

In some embodiments, the invention is implemented with computer software which runs on standard computer hardware. In other embodiments, the invention takes advantage of special-purpose hardware such as biometric scanners. But in each case, the invention helps control the disclosure of sensitive information provided by users, and it does so in a way that goes beyond merely denying access to unauthorized users.

Disclosure is controlled in the sense that (a) the information is not disclosed until specified conditions are met, (b) copies of the information are protected so that at least one copy is likely to be available when disclosure is required, (c) the information is kept secret until disclosure is required, and (d) when disclosure is required, the information is disclosed by being sent to specified destinations. Authorized deletion of the information copies may also be controlled.

While awaiting a disclosure trigger and/or a deletion trigger (either or both of which may never occur in some cases), the information is protected against inadvertent or premature disclosure. Protection is provided by encryption, by dividing the information between messages stored at different locations, and/or by omitting clues that would reveal the full import of the stored information.

For instance, the invention may be used to control disclosure such that (a) sensitive information is not disclosed until the incapacitation or death of the information's source is noted in two separate public sources, (b) thousands of copies of the information are spread in an apparently unpredictable and unrecorded manner throughout a global computer network so that even if many copies are lost or destroyed, at least one copy will probably still be available when disclosure is required, (c) each copy is encrypted so the information remains secret until disclosure is required, and (d) when disclosure is required, at least one copy of the information is sent within a predetermined time period to each predefined destination, such as an email address or a web site, either in a plain text format or encrypted with a public key corresponding to the destination.

In particular, suppose Pat Elder wants to control disclosure of a last will and testament. Using software according to one embodiment of the invention, Pat can create dozens or hundreds of encrypted copies of the will in hidden locations around the world, so that many copies would survive an earthquake or flood that destroys Pat's hometown (including Pat's home, Pat's bank, and Pat's attorney's office). After consulting an attorney, Pat decides that copies of the will should be emailed to each of Pat's children, to Pat's attorney, and to the local courthouse if Pat does not respond within one week to a regular monthly inquiry from the invention. A response will not be accepted by the invention as authentic unless it includes information that (a) identifies Pat as its source, and (b) ensures that a copy of an earlier response from Pat is not being submitted by someone else in an attempt to trick the system. As part of the controlled disclosure, each copy of the last will and testament will be signed using Pat's public key; the copy emailed to the courthouse will be in plain text (decrypted), and each of the other copies will be encrypted using the recipient's public key.

The invention may also be used to escrow source code, legal documents, and other confidential or proprietary information. Accordingly, disclosure may be conditioned on bankruptcy filings, stock prices, news wire stories, and a wide range of other publicly available information. Sources being monitored to determine whether disclosure condition exists may be widely available, such as public media, or they may be specific web sites or news groups.

Conditions and constraints may also be placed on deletion of the escrowed information. For instance, in some embodiments users who provide sensitive information to the system cannot retract it later, even if they establish themselves as the information providers. In some embodiments, sensitive information is automatically deleted if it has not been disclosed after a certain period of time; in some it is deleted if some other deletion condition occurs. Combinations of disclosure and deletion conditions are also possible. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing methods, devices, signals, and systems according to the invention, the meaning of several important terms is clarified; the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms are defined, either explicitly or implicitly, both here in the specification and elsewhere in the application file.

Computer Network

Figure 1:
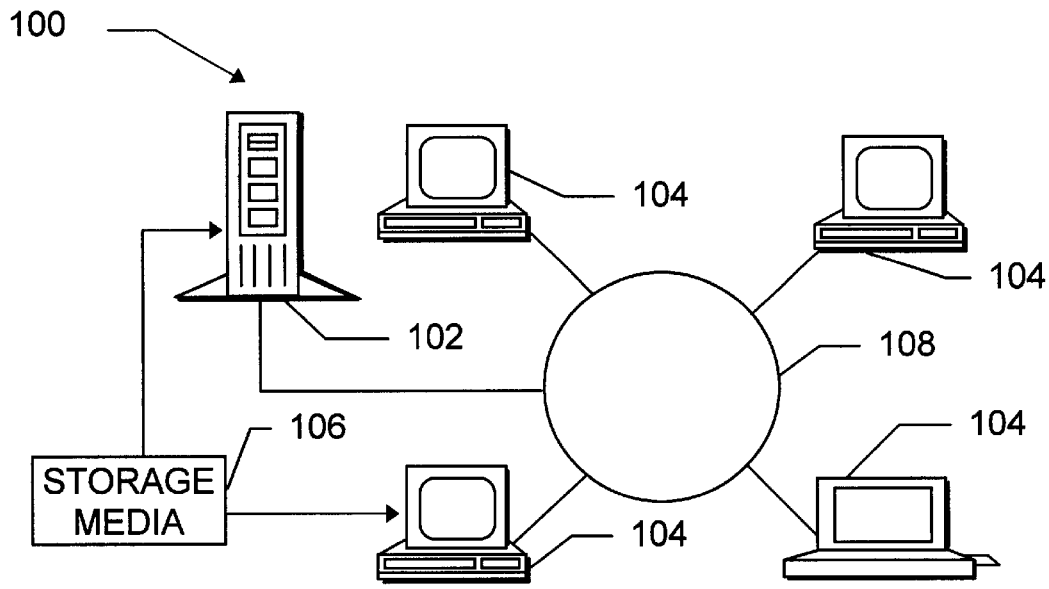
FIG. 1 is a diagram illustrating one of many networks suitable for use according to the present invention.

FIG. 1 illustrates a network 100 which is one of the many computer networks suitable for use according to the invention. Suitable networks include one or more local area networks, wide area networks, metropolitan area networks, and/or "Internet" or IP networks such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

In many cases, a geographically dispersed network, up to and including a global computer network such as the Internet which includes nodes on different continents, is preferred because additional storage locations and physical separation of storage locations and variations in their surroundings (electronic and managerial) enhance the survival prospects for a given piece of information that is spread through the network according to the invention. "Geographically dispersed" means the network includes two nodes which are at least ten miles apart. However, more localized networks like the network 100 may also be used.

The network 100 includes a server 102 and several clients 104; other suitable networks may contain other combinations of servers, clients, and/or peer-to-peer nodes, and a given computer may function both as a client and as a server. Each network includes at least two computers such as the server 102 and/or clients 104. A computer may be a workstation, laptop computer, disconnectable mobile computer, server, mainframe, cluster, so-called "network computer" or "thin client", personal digital assistant or other hand-held computing device, "smart" consumer electronics device or appliance, or a combination thereof.

Each computer includes at least a processor and a memory; computers may also include input devices and/or output devices. The processor may include a general purpose device such as a 80×86, Pentium (mark of Intel), 680×0, or other "off-the-shelf" microprocessor. The processor may include a special purpose processing device such as an ASIC, PAL, PLA, PLD, or other customized or programmable device. The memory may include static RAM, dynamic RAM, flash memory, ROM, CD-ROM, disk, tape, magnetic, optical, or other computer storage medium. The input device may include a keyboard, mouse, touch screen, light pen, tablet, microphone, sensor, or other hardware with accompanying firmware and/or software. The output device may include a monitor or other display, printer, speech or text synthesizer, switch, signal line, or other hardware with accompanying firmware and/or software.

The network may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" 108 known to those of skill in the art. The network may encompass smaller networks and/or be connectable to other networks through a gateway or similar mechanism.

As suggested by FIG. 1, at least one of the computers is capable of using a floppy drive, tape drive, optical drive, magneto-optical drive, or other means to read a storage medium 106. A suitable storage medium 106 includes a magnetic, optical, or other computer-readable storage device having a specific physical configuration. Suitable storage devices include floppy disks, hard disks, tape, CD-ROMs, PROMs, random access memory, flash memory, and other computer system storage devices. The physical configuration represents data and instructions which cause the computer system to operate in a specific and predefined manner as described herein. Thus, the medium 106 tangibly embodies a program, functions, and/or instructions that are executable by computer(s) to help control the disclosure of sensitive information substantially as described herein. Likewise, the "wires" 108 and other data carriers may embody signals for controlling the disclosure of sensitive information substantially as described herein.

Suitable software to assist in implementing the invention is readily provided by those of skill in the pertinent art(s) using the teachings presented here and programming languages and tools such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, port IDs, socket IDS, network addresses in a specific format, and/or other supporting data readily provided by those of skill in the pertinent art(s).

Methods Generally

Figure 2:
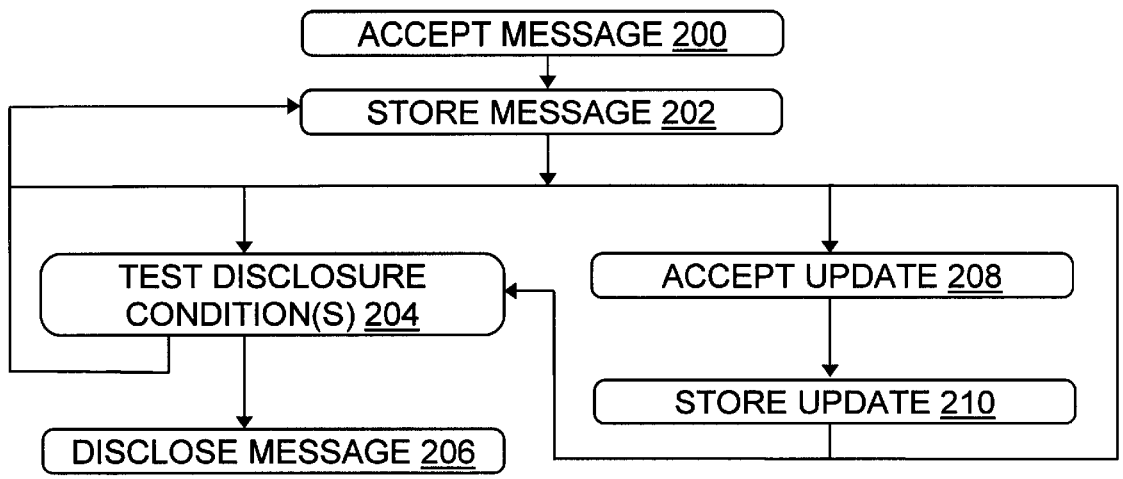
FIG. 2 is an introductory flowchart illustrating methods of the present invention.

FIG. 2 illustrates generally several methods of the present invention; other methods are illustrated elsewhere. Because the invention provides several steps which can be combined in various ways, FIG. 2 and the other Figures are illustrative only.

As shown, the methods include steps 200 and 202 for entering sensitive information into a computer network such as the network 100 and steps 204 and 206 for disclosing the information in a desired way if certain conditions are detected. Some methods also include "deadman switch" steps 208 and 210 for ensuring that the information is disclosed when an expected update from the information provider (or another authenticated user designated by the information provider) is not received on time.

More precisely, during a message accepting step 200, a piece of "hidden choir" software running on the network accepts from a user sensitive information which should be stored in one or more networks for possible later disclosure and/or deletion under specified conditions. The sensitive information may be in plain text form, or the user may have encrypted and/or compressed it. The sensitive information may include text, images, sounds, and/or any other information that can be stored and transmitted in digital form.

The user may be a "regular" user, or a user who logs in only to use the inventive software, or a system administrator, for instance. A user may be a person, or a user may be a software task, thread, agent, or other computer process acting legitimately on behalf of a person or on behalf of a group of people. A "person" may be an individual, a corporation, a limited liability company, a partnership, a university, a government agency, or another institutional entity.

In addition to providing the sensitive information, the user either provides or ratifies instructions for the possible disclosure and/or deletion of that information. Ratification occurs when the user acquiesces in disclosure and/or deletion instructions which are provided by the system as default parameters, hard-coded methods, or otherwise. Disclosure and deletion is merely "possible" because in particular cases the conditions that would trigger such actions might never occur.

In short, the message accepting step 200 gathers the sensitive information, the disclosure and/or deletion conditions, and provides them to a message storing step 202. The message accepting step 200 and message components are described further in connection with FIGS. 3 through 5.

During the message storing step 202, the invention hides copies of the sensitive information in the network 100 by creating copies of the message and transmitting them in various guises to various locations in the network 100. In some cases, an information provider may know the location of at least some of the copies, but in general the information provider does not know in detail how and where the message copies are stored; in embodiments which allow the information provider to delete stored copies, the system locates the copies. The number of copies made may vary, even by several orders of magnitude, with at least 10 or at least 100 or at least 1000 made in various cases. The number of copies made is not necessarily revealed to the information provider.

In some embodiments, a relatively small number of locations (compared to the number of network nodes) is used. In others, the step 202 puts copies of encrypted message content in most or all available locations in the network (or portion of net). In either case, a given node may contain more than one copy of a given message, with different copies stored under different names and in different disguises.

The ultimate number of message copies and the path taken by each copy is determined dynamically. The path taken by a given copy may cover a few network nodes or many network nodes, and it may be determined randomly and/or using information which authenticates the information provider. In some embodiments, one or more message copies keep traveling either until they are destroyed or until message disclosure or deletion is triggered. Message storing steps are described further in connection with FIG. 6 and elsewhere.

During a testing step 204, a portion of the invention checks stored messages to determine if they should be disclosed. This may be implemented in various ways. One or more searching message update agents may travel specified regions of the network in an exhaustive path looking for message copies and checking any message copies encountered; searching updates are not directed at a specific message copy. Update agents or update instructions directed at specific message copies may also be sent out along paths previously followed (at least ultimately) by those message copies, using methods similar to those employed in various embodiments of the storing step 202. The messages themselves may also include code which monitors conditions to determine if disclosure or deletion is appropriate, independently of any updates.

Regardless of the manner in which disclosure is triggered, if it is triggered then during a disclosing step 206 some or all of the message contents are sent to their destination(s) in formats which may be predefined by the user or provided as current defaults by the system. The disclosed contents may be limited to some or all of the sensitive information, or the disclosure may include additional components such as one or more of the message components discussed below in connection with FIGS. 4 and 5. The testing and disclosing steps are described in further detail in connection with FIGS. 3 through 5 and elsewhere.

During an optional update accepting step 208, the illustrated embodiment accepts and authenticates updates for messages. In some cases the update affirms that the information provider does not want the system to disclose any part of a given message yet, making the update analogous to the "deadman switch" used in a railroad or subway engine; as long as the engineer periodically pushes the deadman switch, the train keeps running. If the engineer has a heart attack and the switch is not pushed for some time, the train is automatically brought to a halt. Messages may similarly be configured to be disclosed if the information provider does not regularly submit an authentic update. In other cases, a message update triggers disclosure rather than preventing it. In some cases a message update triggers deletion of message copies. The update accepting step 208 and an update format are described in further detail in connection with FIG. 10 and elsewhere.

During an update storing step 210, the software and/or hardware creates and stores copies of the update. In some embodiments, the invention transmits updates to the same locations in the network as the stored message copies, or at least sends the updates along the paths taken by the message copies. In other cases, the updates search the network looking for message copies. As with the message storing step 202, precautions are taken to prevent shadowing or unauthorized use of transmitted items. The update storing step is described in further detail in connection with FIG. 10 and elsewhere.

Message Acceptance

Figure 3:
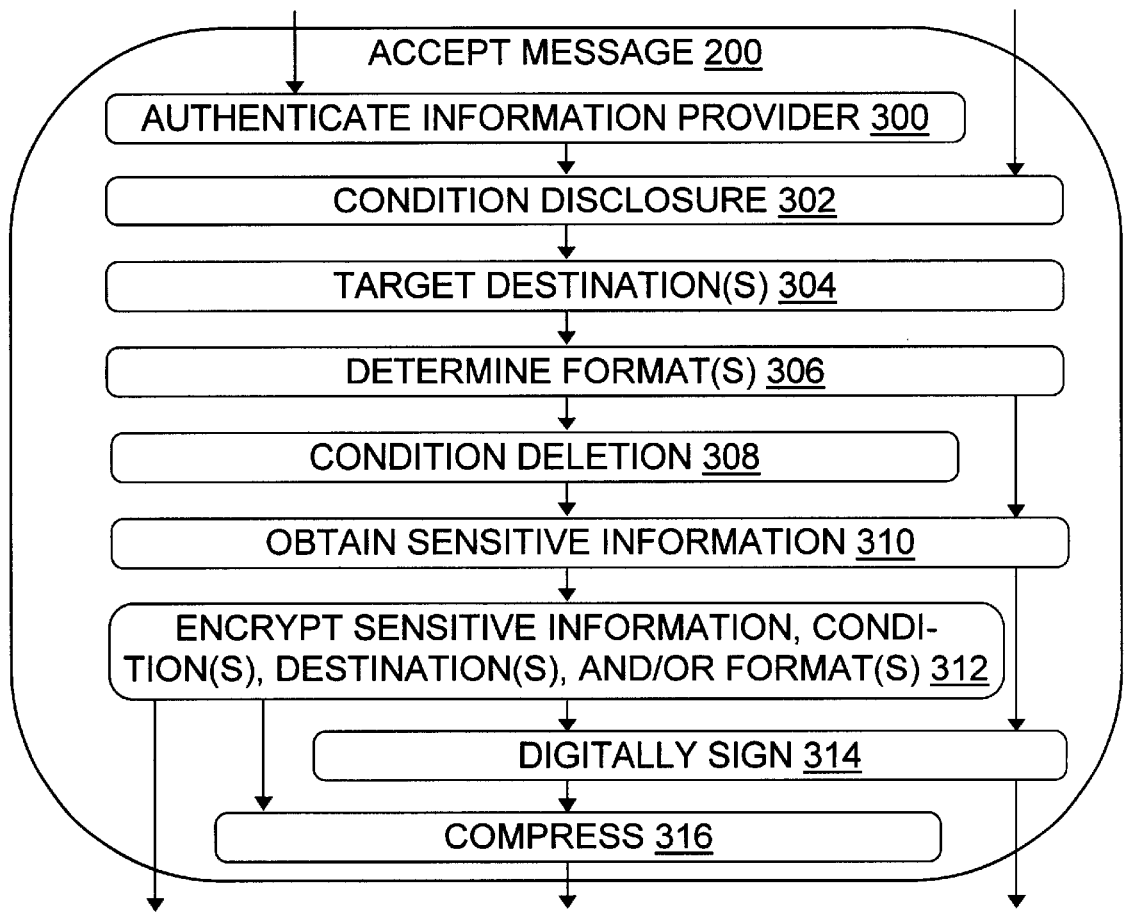
FIG. 3 is a flowchart illustrating a message accepting step of the invention.

During message acceptance, a user entrusts sensitive information to the inventive software and/or hardware for disclosure under specified conditions. The user is referred to here as the "information provider" with the understanding that in many embodiments the user also expressly provides other message content as well, such as disclosure and deletion conditions. FIG. 3 further illustrates various embodiments of the message accepting step 200. As with other method steps, details of corresponding system, signal, and device components will be understood by those of skill in the art in view of this discussion and other parts of the present specification. For instance, those of skill will readily apply descriptions of a given method step to the construction and use of corresponding systems and articles that perform the step and of corresponding signals that embody results used by and/or produced by the step.

During an optional provider authenticating step 300, the system obtains information identifying the information provider and attempts to authenticate the identification. The information provider may be identified and/or authenticated using familiar tools and techniques. For instance, the information provider may be identified by a login name and authenticated by a password. A "password" includes one or more individual pass words, pass phrases, biometric scan results (e.g. retinal scan, fingerprint, voiceprint), other identification method results, symmetric key or other cryptographic or digital signature keys, secret email or other identifying codes, GUID, and/or any other data or devices used to protect or control access to an account or another resource in the system 100.

The authenticating step 300 may be omitted in some circumstances. For instance, the software may be configured to make identification optional; this might be combined with a requirement that a message cannot be retracted unless identification is provided. Of course, some embodiments may be configured so that the message cannot be retracted regardless of whether identification is provided. In some embodiments the authenticating step 300 can be omitted if the information provider wishes to remain anonymous.

During a disclosure conditioning step 302, the system obtains the disclosure conditions that determine when (and whether) the sensitive information entrusted to the system will be disclosed. The logic of disclosure conditions may be relatively simple, such as "if no update has been received from X, Y, or Z in the past six months, then disclose the information" or "disclose the information only if I send an update containing the word 'implode'" or "regardless of updates, disclose the information if any press release on site W is seen to contain the phrase 'ABC will acquire XYZ'" or even "disclose the information as soon as possible after Jul. 11, 2060."

The logic of disclosure conditions may also be more complex, such as "disclose the information if a monthly search indicates that company A receives a patent or owns a published patent application having key phrases X, Y, or Z in the abstract or claims, or if the search indicates that any company has received a patent or owns a published patent application in classes K or L which lists M as an inventor." This latter example could be used to control disclosure of information which is meant to be kept as a trade secret unless circumstances suggest it might be more useful as prior art.

In either case, the underlying tools for determining whether a disclosure condition has occurred may be very simple or they may be quite sophisticated. By way of example only, powerful tools and techniques may be used (a) to analyze natural language in news accounts and other electronic postings for statements describing events such as the acquisition of a company or the death of an individual; (b) to make determinations of financial market health or political stability based on news reports, market prices, and other factors; and (c) to detect spurious updates. Suitable tools and techniques are familiar to those of skill in the arts, and no doubt additional improvements will be made in such tools and techniques, further enhancing the power and convenience of systems according to the invention.

During a disclosure destination targeting step 304, the software determines, at least by category and perhaps by specific address, the disclosure destinations that will receive a copy of the information once a disclosure condition occurs. Disclosure destinations may be specified by the information provider and/or by the system in a wide variety of ways. They may take the form of email addresses, web page addresses, and/or regions. Web page addresses may be listed as textual universal resource locators or as textual or binary hard-coded network addresses. When web pages are used as destinations, the information provider and/or the system may indicate that existing web pages should be modified to disclose the information and/or indicate that new web pages containing the information should be generated and placed at the specified addresses.

In the case of regions, email addresses and/or web page addresses in the region may be obtained automatically at the time of disclosure by the system or they may be provided earlier by the user. Blanket disclosure to a region may be specified by requesting all available locations in the region, by requesting some percentage of all available locations, or by requesting some minimum number of locations to which the information will be sent. Regions may vary in size, from "Corporation XYZ" to "newsgroup A.B.C" to "USA" to "everywhere possible". If multiple destinations are specified, by specifying a region or otherwise, then the disclosing copies may be sent in groups spaced out over time, or they may all be sent as nearly simultaneously as is technologically possible.

In some embodiments, a formatting step 306 allows users to determine formats to be used in disclosing the information. In other cases, the formats used are selected during an embodiment of the step 306 which is performed by the system without interactively requesting the user's preferences. For instance, in one embodiment all disclosures are in plain text (ASCII) format sent as email generated by the system. Possible formats include plaintext, digitally signed, encrypted, XML or HTML, and other formats for electronic documents. Format specification may include the text to be placed in an email subject line in email messages generated by the disclosing step 206.

Web pages may also be generated, partially or entirely, during the disclosing step 206. If web pages are among the destinations, then format specification may include a request that web links to the disclosing page be created and sent out in email messages and/or that the web links be embedded in identified existing pages. In some embodiments, formats are a function of the destinations. For instance, in one embodiment, email addresses receive plain ASCII text, http:// URL destinations receive HTML, and FTP sites receive plain text and HTML.

During an optional deletion conditioning step 308, the software obtains the deletion conditions that determine when (and whether) the sensitive information entrusted to the system will be deleted without an unauthorized intervention. Some deletion conditions may be implicit in an embodiment, such as deletion of messages after they have been disclosed and the disclosure has been adequately acknowledged. Other deletion conditions may be explicitly stated by the information provider. The logic of deletion conditions, like the logic of disclosure conditions, may vary in complexity. The same tools and techniques used to detect disclosure conditions may be used to detect deletion conditions.

During a sensitive content obtaining step 310, the software obtains the sensitive information which is to be disclosed if, and only if, the disclosure conditions occur. The sensitive information may be provided to the system in plaintext form or in encrypted form. In particular, information disclosed by the system in response to a disclosure condition may be encrypted. For instance, a user could provide several other parties with decryption keys which are useful only in the event of disclosure by the system.

Regardless of whether the sensitive information is already encrypted, the system may encrypt (or re-encrypt) the information during an optional encrypting step 312. The disclosure conditions, formats, and/or destinations may also be encrypted. Encryption tools and techniques are well-known in the art, and any suitable ones may be used, including without limitation public key-private key encryption, symmetric encryption, and/or encryptions described in Schneier, *Applied Cryptography* and other references.

The encrypted information may also be digitally signed during a signing step 314 using familiar techniques and tools, including those described in Schneier, *Applied Cryp-*

*tography* and other references. Checksums or cyclic redundancy codes may also be used as a form of weak but easily generated digital signature. In addition, the information may be compressed before or after encryption and/or signing; compression is performed during a compressing step 316 by using familiar techniques and tools.

Those of skill in the art will recognize that encryption, digital signing, and compression can be performed on part or all of a given message, on several portions of a given message, in various nested manners, with different keys, and in other combinations. Those of skill will readily identify and implement approaches that protect the secrecy and integrity of the sensitive information and the disclosure conditions and destinations specified in messages according to the invention.

In particular, digital signatures may be used in place of encryption if the information provider wishes to make the information and/or conditions and/or destinations visible while still preventing tampering and still controlling disclosure of the full implications of the information. Sometimes the mere fact that information is encrypted will draw unwanted attempts to decrypt or delete the information. By contrast, an apparently innocuous plaintext message may avoid being targeted.

The general lack of interest in plaintext is useful if the full meaning of a plaintext message becomes apparent only when one has additional information not found in the message itself. For instance, a message containing nothing but three columns of numbers has little apparent meaning. The message becomes more interesting if one learns from some other source that each number in the first column identifies a contract while the second and third numbers represent the low bid and the accepted bid, and it becomes very interesting indeed if a review of the circumstances involved raises a question as to why low bids were sometimes rejected.

Example Accepted Message Formats

Figure 4:
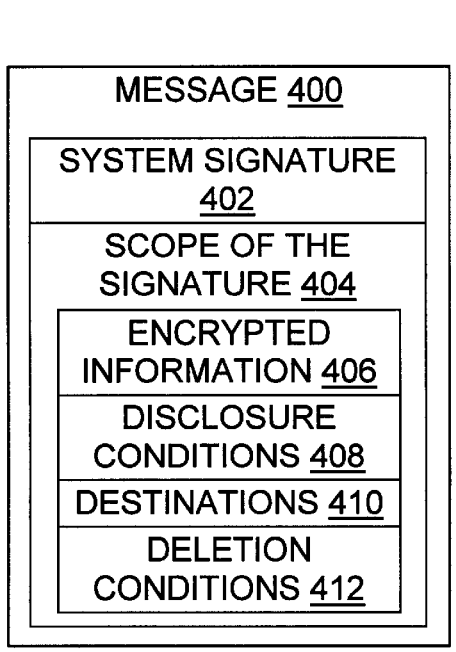
FIG. 4 is a diagram illustrating a message format according to the invention.
Figure 5:
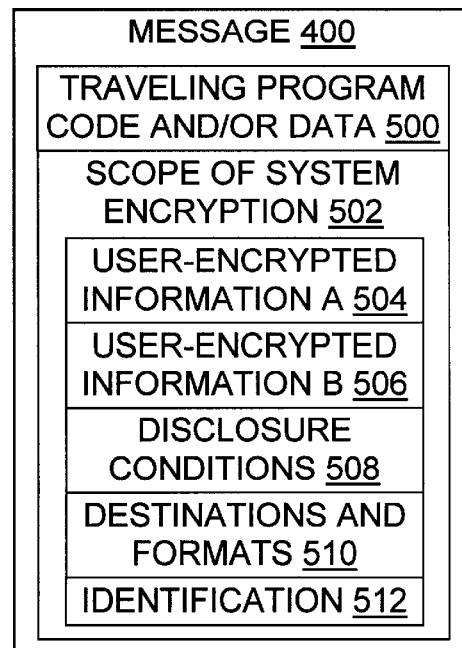
FIG. 5 is a diagram illustrating another message format of the invention.

FIGS. 4 and 5 illustrate some of the many possible formats for messages 400 which are produced by the message accepting step 200. In FIG. 4, the message 400 includes a digital signature 402 which is based on other several components of the message 400. The components on which the digital signature 402 is based define a scope 404 for the signature 402. The digital signature 402 reflects the content of the components in the scope 404 of the signature in order to detect tampering with, or removal of, such content.

In the illustrated embodiment, the scope 404 of the signature 402 includes encrypted sensitive information 406, disclosure conditions 408, destinations, 410, and deletion conditions 412. The information 406 may have been submitted during step 310 in encrypted form, and/or it may have been encrypted by the inventive system during step 312. The disclosure conditions 408 were specified during step 302; the destinations 410 were specified during step 304, and the deletion conditions 412 were specified during step 308.

Each of the disclosure conditions 408, destinations 410, and deletion conditions 412 may or may not be encrypted, depending on the embodiment. For instance, it may be useful to encrypt the sensitive information 406 but leave some or all of the conditions 408, 412 and destinations 410 visible and send a notice to an interested third party with a copy of the message 400 after the message has been stored by the inventive system. The message 400 illustrated in FIG. 4 includes no explicit format instructions but instead contemplates that format(s) for the disclosure are provided by the software during the format determining step 306 and/or the disclosing step 206.

FIG. 5 illustrates another message 400 produced by the message accepting step 200. In this case, the message 400 includes traveling program code and/or data 500 which enables the message 400 to move autonomously from one network node 102 and/or 104 to another. Traveling messages 400 may be constructed using tools and techniques employed in designing and implementing agents, web crawlers, robots, and other familiar traveling programs. Instead of using traveling code 500, or in addition to it, message 400 copies may also move from one node to another by other means, such as conventional connections or sockets or links for sending and/or receiving files, servlets, applets, video, audio, email, or other data in the network 100.

In addition to traveling program code 500, messages 400 may include code for taking certain actions or making certain determinations discussed herein. Functionality to take such actions and/or make such determinations may also be embedded in software that is located on, or is in communication with, the node on which the message 400 in question is located. For convenience, when this description states that a message 400 does something, it should therefore be understand that the code being executed may be stored in the message 400 in some embodiments and outside the message 400 in others.

The message 400 in FIG. 5 also includes several components which have been encrypted by the software and thus lie within a system encryption scope 502. These components include two pieces of user-encrypted sensitive information 504, 506; disclosure conditions 508 for each piece of information 504, 506; destinations and formats 510 for the information 504, 506; and an identification 512 of the information provider.

FIG. 5's message 400 illustrates the fact that in some embodiments a message 400 guarded by the system may contain multiple pieces of sensitive information with correspondingly flexible disclosure conditions and destinations. For instance, different pieces of sensitive information might be sent to different people if disclosure is triggered, or the information pieces might be released in stages to the same person, with each stage having its own disclosure condition (s) such as the passage of time or the public posting of certain text at a particular site.

Those of skill will appreciate that many other message formats than the ones shown in FIGS. 4 and 5 are possible with the invention. In particular, the illustrated components may be combined in other ways. For instance, additional digital signatures may be used, each stage of a staged disclosure may be signed, deletion conditions may be encrypted, selected components or the message as a whole may be compressed, information provider keys or credentials or other identification/authentication components may be included or omitted, creation timestamps and locations may be included or omitted, and multiple message 400 formats (as well as multiple message copies in a given format 400) may include the same sensitive information.

Message Storage Generally

During message storage, the system stores copies of the accepted message(s). Message storage according to the present invention takes a different approach than conventional escrow methods. A conventional escrow system stores items from many different sources in a single secure vault, or at most a small number of such vaults. A conventional escrow service typically has a single vault in a given region or country, and it relies on strong physical security measures such as steel safes, human guards, and the like. Conventional escrow services also place great weight on control over physical conditions such as temperature and humidity. Moreover, access to stored items, and disclosure of stored items, is through the human escrow agent. Multiple instances of an item are not necessarily stored, because of limited space considerations and consequently higher costs. There are other differences as well.

By contrast, a system according to the invention may benefit from physical security measures, but it does not rely on them as the principal means for ensuring survival of stored information. Instead, the invention takes advantage of the size and scope of networks, particularly global networks such as the Internet or large corporate networks having many nodes dispersed over a variety of platforms and locations. The invention stores copies of sensitive information on many nodes, in locations which are difficult or impossible to determine without authorization (and in some embodiments, even with authorization from the information provider). Thus, even a determined attack is unlikely to locate and destroy all copies. Disclosure may also be fully automated.

Moreover, in some embodiments a given message 400 contains information from more than one source, and users are informed of this. Thus, an attacker who deletes a copy of a message 400 does not necessarily know the identity of all information providers being attacked. This forces the attacker to risk the wrath of unknown parties. In one variation, individuals or small businesses can purchase space in messages 400 from more powerful entities, so their information 406, 504, 506 is interleaved with that of the more powerful entity. The powerful entity may or may not view the information it stores in this interleaved manner as particularly important in and of itself; the powerful entity may simply be lending its strength and reputation—at a price—to help discourage tampering with the information of others.

Message storage according to the invention may be accomplished in various ways. Two general approaches in the form of "roving messages" and "poised messages" are described below, but other approaches which provide controlled disclosure by utilizing a network for information escrow according to the teachings herein also fall within the scope of the claimed invention.

Roving Message Storage

Figure 6:
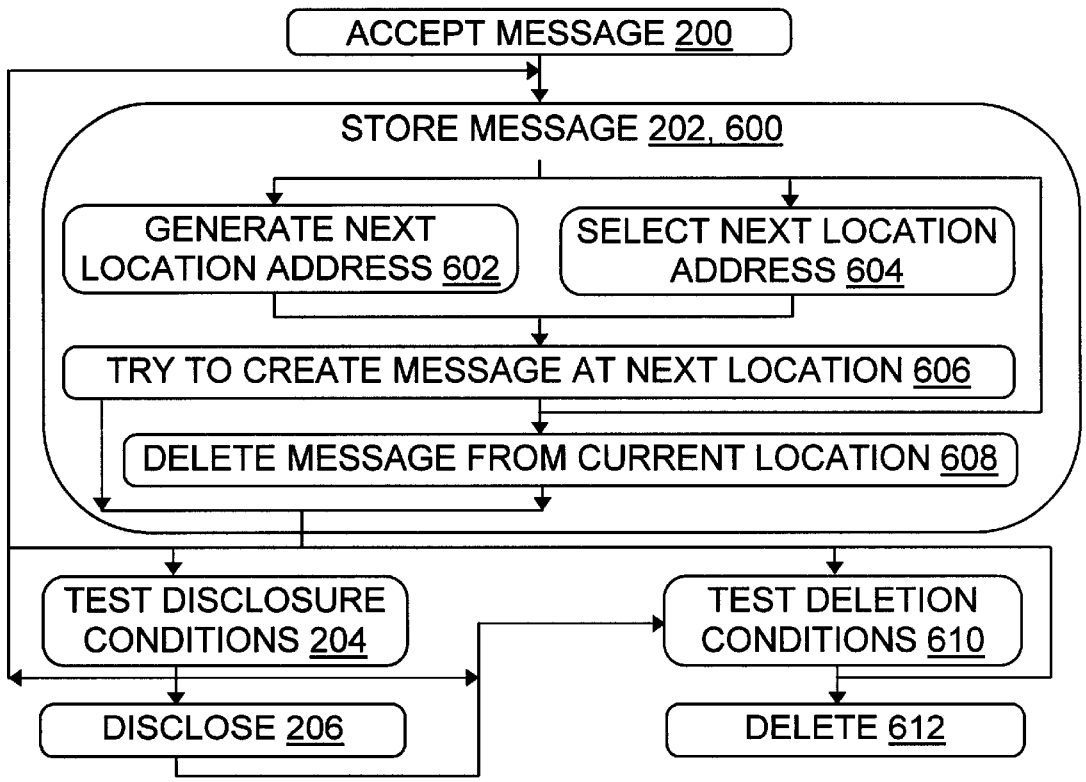
FIG. 6 is a flowchart illustrating methods of the invention for controlling information disclosure using roving messages.
Figure 7:
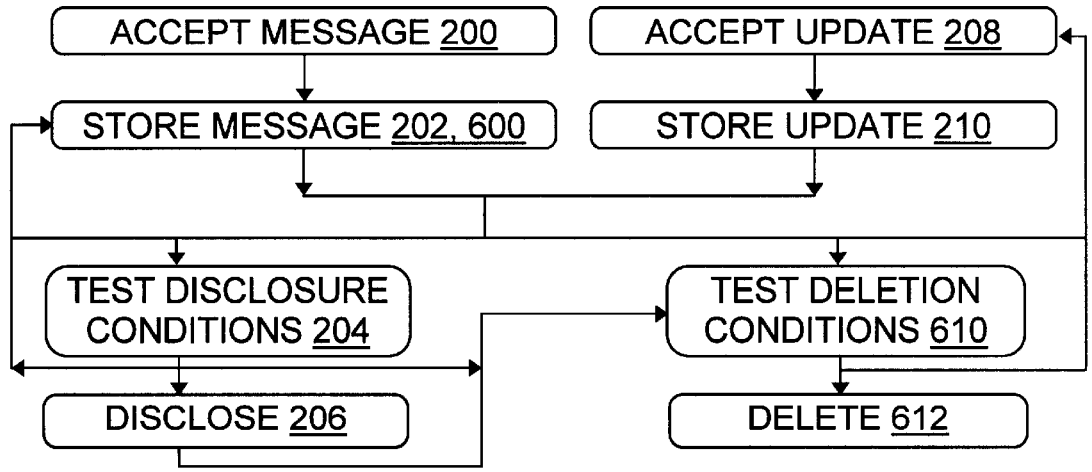
FIG. 7 is a flowchart illustrating methods of the invention for controlling information disclosure using roving messages and message updates.

FIGS. 6 and 7 illustrate methods employing a "roving message" approach to the message storing step 202. Roving messages may be implemented with traveling program code and/or data 500, or without it; the term "roving" is used in contrast with the term "poised" discussed later. Briefly, roving messages are implemented by making message 400 copies travel from node to node indefinitely until disclosure or deletion. Poised messages, on the other hand, may initially traverse one or several nodes, but do so in order to reach a specific destination and, once there, stay put until disclosure or deletion.

In order to better illustrate the update steps 208, 210, assume that embodiments according to FIG. 7 use disclosure conditions and/or deletion conditions which depend on at least one update, while embodiments according to FIG. 6 do not. In practice, a given inventive system may employ approaches shown in either or both Figures.

A roving message storage step 600, which is one type of message storing step 202, starts by obtaining the address of a next target location. This may be accomplished by an address generating step 602, an address selecting step 604, or a combination of the two steps. An address may be in the form of an IP address, Ethernet address, URL, email address, and/or other network address which identifies a physical or virtual node, and may include a directory path component and/or a file disguise (e.g., use of *.c, *.cpp naming conventions and/or internal syntax) which further specify how to store a message 400 copy on a given node. FIG. 6 refers to a "next" location, but it will be appreciated that when the system first stores a newly accepted message 400, the "next" location is also the first location.

The address generating step 602 works best when valid addresses are relatively dense in the space of possible system 100 addresses, since the step 602 proceeds by generating an address whose syntax is correct but which does not necessarily correspond to any presently reachable location. For instance, if the syntactic range for IP addresses is assumed to be 1.0.0.0 to 239.255.255.255, then the generating step 602 could proceed by generating four random numbers, pinning or truncating them to the indicated ranges (1..239, 0..255, 0..255, and 0..255), and adjoining them to form an IP address. Alternatively, one large random number could be sliced to form the IP address by using the first eight bits for the first part of the address, the next eight bits for the next part, and so on, with appropriate rounding or truncation to fall within the required ranges.

Instead of generating an address with the right syntax that may or may not be valid, the address selecting step 604 selects an address from a list or table of addresses that were, at least at one time, both syntactically correct and valid (reachable from the present location). Those of skill in the art will understand how to obtain such address lists from routers or other sources and how to verify the syntax of a given address. The table of addresses may vary in size. Tables having many entries make messages 400 harder to locate and destroy, but they also require more storage space in messages 400 and their corresponding updates 1000.

Instead of using a random number, or in addition to using one or more random numbers, the address could also be generated during step 602 or selected during step 604 by using the identification or authentication information obtained during step 300. For instance, if lack of a timely update can trigger disclosure (as presumed in FIG. 7) then steps 602 and 604 provide addresses in a manner that depends on the authentication information provided when the message was stored. That same authentication information must be provided with each update. If the authentication information is provided correctly, then the update can follow the path of the original message (spawning additional copies just as the original message did), find each copy of the original message, and prevent disclosure. If proper authentication information is not provided, then at least one copy of the message 400 will not receive an update and disclosure will be triggered.

On the other hand, if the disclosure and deletion conditions are independent of message updates (as presumed in FIG. 6), then steps 602 and 604 provide addresses in a random or quasi-random manner. Hash functions, random number generators, and other familiar tools may be used. For instance, the address generating step 602 may generate a set of quasi-random numbers in the appropriate ranges and adjoin them to form the next IP address, Ethernet address, or other address; the address selecting step 604 may generate a single quasi-random number and use it to index the table of addresses to select the next address.

To provide addresses in a manner that depends on the authentication information, step 602 may interpret the first N bits of authentication information as an N-bit address. Alternatively, step 602 may interpret M bits of authentication information as part of a N-bit address (N>M), with the rest of the address chosen in a predetermined manner to improve the chance of generating a valid reachable address.

For instance, in an IP address the leftmost component might be taken to be the same as the current address, while the other components are taken from the authentication information.

Of course, many variations are possible when mapping authentication information to network addresses during step 602, including manipulating the authentication information to reduce or remove long strings of zeroes and long strings of ones before selecting the N bits, selecting the N bits from within the authentication information bit-string instead of from the end, making the next address a function of both the authentication information and the current address, and so on. Similar considerations apply to the use of authentication information as an index into a table of addresses during step 604. Whatever implementation is used, however, must be reproducible by an authentic update so it can follow the message copies, and should also be difficult to deduce or reproduce without the authentication information so that unauthorized updates are prevented.

During a creation trying step 606, the system tries to create a copy of the message 400 at the address provided by step 602 or step 604. This may be done by the message itself through traveling code, or by transmission of a message 400 copy in a file to code residing on the target node, or by other data transmission means. If the attempt fails, another address is obtained by repeating step 602 or step 604. The attempt may fail because the address is not valid, or the address may be valid but the node at that address may be down or it may refuse incoming message copies, for instance. If updates are not involved (FIG. 6), then additional addresses may be obtained (steps 602, 604) and tried (step 606) until the message 400 is successfully copied during step 606.

A similar loop may be performed when updates are involved (FIG. 7). However, there are additional considerations. Suppose one or more addresses were not valid when tried by the message but are valid when tried later by the update(s); node(s) may have been added or one or more address assignments may have changed. Indeed, address syntax may have changed. Then the updates may follow a path not taken by the message copies, and the risk of unwanted behavior arises. The concern also arises if a node was down, or was configured to refuse messages 400 (by blocking out traveling programs, for instance) when tested by the message, but is now back up and will accept the update.

One apparent solution is to simply make the updates 1000 follow every possible path. However, proliferating so many updates could place unacceptable burdens on the network 100. Better approaches are possible. For instance, the message 400 may leave a digitally signed (and possibly encrypted) marker for the update 1000, indicating that the message 400 is taking the Kth address from a list of addresses known to the message and the update. The list of addresses may be carried by the message 400 and the update 1000 or the list may be resident at the node, possibly in disguised or encrypted form. Since the update obtains addresses using the same algorithms and seeds (authentication information and/or current address, for instance) as the original message, this provides enough data for the update 1000 to follow the message 400 without revealing the path to unauthorized users. Alternatively, the address itself may be provided, stored on the node in an obscure file in encrypted or file-disguised form. If a file disguise is used, then the disguising file name and/or syntactic format preferably correspond to a file type which tends not to be deleted, such as *.exe or *.dll or administrative files. For instance, the address could be placed in an otherwise unused data block in an executable file that simply prints the current date.

Yet another approach puts a small cap on the number of addresses tried during the loop through steps 602 to 606. For instance, if a valid address is not selected in three tries, the message 400 copy stops traveling. The updates 1000 then propagate, but not as rapidly, because they only need to explore the first three addresses at each node; a limit may also be put on the maximum number of hops a message 400 copy can take.

A "hop" for purposes of the present invention is not necessarily a packet-level or data link layer hop. Rather, a hop is a movement of messages 400 or updates 1000 between two nodes whose addresses are expressly known to the message 400 or the update 1000, respectively. At lower levels of abstraction, the network operating system or other communications software in the network 100 may actually send the message or update as one or more packets to many nodes as part of a single hop.

After the message is copied to another node by step 606, an optional step 608 deletes the copy on the current node. If the copy deleting step 608 is always performed, then one copy of the message 400 roves around the network. In a variation, the first execution of step 600 stores a large number of message copies on network nodes, with one or more copy per node, and then each of those copies roves without spawning any further copies. On the other hand, if the copy deleting step 608 is never performed then copies of a message 400 proliferate rapidly, spreading in an expanding tree from the node that accepted the message 400 during step 200. Of course, intermediate approaches are also possible, with message 400 copies spawned every X hops or every Y minutes, for instance.

In FIGS. 6 and 7, the system tests disclosure conditions during step 204 and discloses the message information during step 206 if one or more disclosure conditions are satisfied. The system also tests deletion conditions during a step 610 and deletes the message during a step 612 if one or deletion conditions are satisfied. Deletion conditions and disclosure conditions were discussed in connection with FIGS. 3 through 5.

Poised Message Storage

Figure 8:
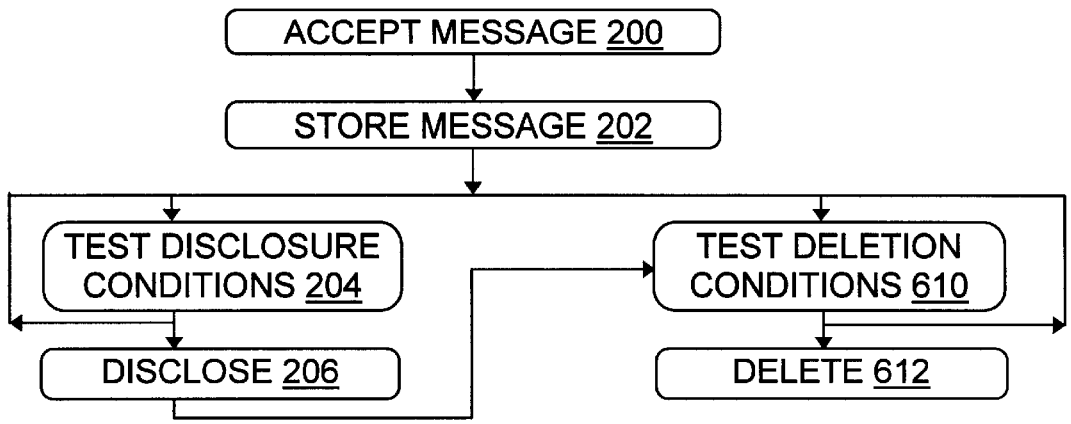
FIG. 8 is a flowchart illustrating methods of the invention for controlling information disclosure using poised messages.
Figure 9:
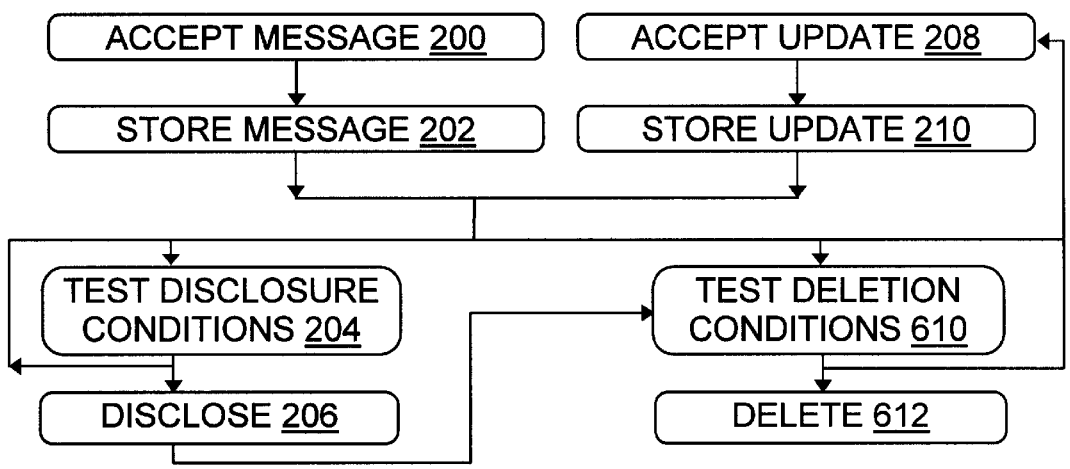
FIG. 9 is a flowchart illustrating methods of the invention for controlling information disclosure using poised messages and message updates.

FIGS. 8 and 9 illustrate methods employing a "poised message" approach to the message storing step 202. In a manner similar to FIGS. 6 and 7, we presently assume that embodiments according to FIG. 9 use disclosure conditions which depend on at least one message update, while embodiments according to FIG. 8 do not. In practice, a given inventive system may employ either or both approaches. Note that some embodiments will accept an update 1000 having a designated effective date even before a message 400 to which the update applies is accepted by the system. That is, steps 208 and 210 may precede steps 200 and 202 in some cases.

The major difference between poised messages 400 and roving messages 400 lies in the nature and frequency of the message storing step 202. As discussed above, roving messages 400 move about the network indefinitely and may spawn copies of themselves as they go. By contrast, poised messages 400 reach their ultimate destination in one hop, or at most a very few initial hops, and then stay at that address while they await message updates 1000 and/or triggering conditions.

For instance, one of the methods illustrated by FIG. 8 proceeds as follows: after an initial message acceptance step 200 and message storage step 202, the system goes into a loop which tests for disclosure conditions at least once each day during the step 204. If a disclosure condition is found, the sensitive information is disclosed during step 206 and the method terminates.

In a variation, the message checks for deletion conditions after the disclosure, and terminates with step 612 after a deletion condition is found. Disclosure may be a deletion condition, or the occurrence of an event that might be provoked by disclosure could be a deletion condition. Receipt of an authentic message update 1000 which requests deletion could also be a deletion condition.

In another variation, the system goes into a loop which tests in turn for disclosure conditions and for deletion conditions during steps 204 and 610. The system performs the test each time a certain dynamic library module or software component is loaded and initialized for service. Many other variations are also possible.

One message storing step 200 suitable for storing poised messages uses two hops for each copy of a given message that is being stored. All copies of a given message 400 are sent out concurrently, or nearly so, and the first copy, which is on the message accepting node, is then optionally deleted. The copy destinations for the first hop (or in the case of N hops, the destinations for the first N-1 hops) are generated randomly or quasi-randomly. Indeed, if updates are also being sent for the message (FIG. 9), then the first hop (or first N-1 hops) taken by the updates 1000 will generally not follow the same node-to-node paths as the paths that were taken by the message 400 copies. In some embodiments, this flurry of apparently randomly addressed update transmissions includes decoy updates which do not contain update information, but exist instead to provide cover for the actual updates 1000.

The destination address for the last hop is generated or selected using authentication information 512 and a message copy index. The message copy index distinguishes at least some copies of a given message 400 from other copies of the message 400 that are being stored by the system. In the simplest case, the index is just increasing integers, identifying copy 1, copy 2, . . . , copy k of the given message 400. But the message copy index may also follow a sequence other than 1, 2, 3, . . . , such as counting by sevens, or using the Fibonacci sequence 1, 1, 2, 3, 5, 8, . . .

As a result, all message 400 copies are ultimately sent to destination nodes that can be identified if one has the authentication information 512 and knows how message copy index values are assigned. Even if updates 1000 take different paths than the message 400 copies they target, the updates and the copies ultimately arrive at the same destinations. In a variation, updates 1000 are also sent to locations that do not hold a message 400 copy, but every location holding a message 400 copy also receives at least one update 1000.

Sending out messages 400 and updates 1000 along paths having one or more random hops at the beginning of the path makes it more difficult to locate all copies of a message 400 by simply monitoring transmissions from the message accepting node and/or monitoring updates 1000 sent by the information provider from any given node. Knowing the initial destination of the message 400 copies and the updates 1000 does not help the eavesdropper determine the present location of the message 400 copies.

Example Message Update Formats

Figure 10:
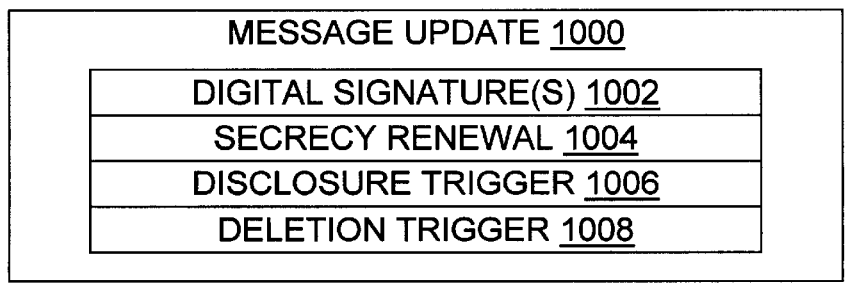
FIG. 10 is a diagram illustrating a message update format according to the invention.

FIG. 10 illustrates formats for message updates 1000 which are produced by the message update accepting step 208. As with the message formats shown in FIGS. 4 and 5, some of the components shown are optional in some embodiments, and components may also appear in different orders. Updates 1000 may also include components not shown in FIG. 10. In particular, some message updates 1000 include address lists, traveling program code and/or data similar to the component 500, and/or instructions for a message 400 to change its security approach by changing file disguises or changing between poised and roving storage, for instance.

In the illustrated embodiment, one or more digital signatures 1002 are provided to allow message 400 copies or associated "hidden choir" software to detect tampering with message updates 1000 and thus avoid relying on fraudulent updates 1000. The digital signature(s) 1002 may also be used to authenticate the update 1000 to the message 400 copies. As with the digital signatures 402 in messages 400, the digital signatures 1002 in updates 1000 may be generated by the inventive system, by the provider of the sensitive information, or both, and may vary in nature and scope between embodiments.

A message update 1000 provides one or more of the following functions: preventing message disclosure, triggering message disclosure, triggering message deletion, and instructing the message copies to change their security approach. An embodiment need not support all of these functions.

To prevent message disclosure in an embodiment which uses a "deadman switch" approach, a secrecy renewal 1004 may be included in updates 1000 that are sent to at least the same locations as the messages 400. A digitally signed timestamp or other tool analogous to those familiar in the art is used to prevent replay attacks in the form of unauthorized repetition of an earlier secrecy renewal in lace of a missing renewal. If authentic, the secrecy renewal in effect tells the message 400 or associated software that "your creator is still healthy and does not wish the sensitive information to be disclosed yet." Conversely, messages 400 may be configured with a reverse deadman switch, so that disclosure happens only if an authentic disclosure trigger 1006 is received by the message 400.

As noted, capabilities involving disclosure conditions and deletion conditions are somewhat similar, so a deletion trigger 1008 may also be used in some embodiments. On the other hand, an embodiment may also support "uncancelable" messages, in the sense that a message 400 which has been accepted cannot later be withdrawn even if the user who provided the information to the system wishes to cancel the message and prevent disclosure. This is accomplished by ignoring deletion triggers 1008 and deletion conditions 412, or by not supporting them at all. This provides a safeguard against message cancellation under duress.

In one embodiment, an option to delete a message 400 is apparently presented to the information provider. However, in accordance with a condition previously specified by the information provider, invoking the option will actually result in an emergency action, such as an email for help or a disclosure of selected information, rather than deletion without disclosure. Thus, an information provider who is under duress may secretly call for help or take other action that would not be permitted if performed openly.

Message Update Storage

The same tools and techniques discussed in connection with storage of roving messages 400 and poised messages 400 may be used for corresponding updates 1000 to such messages 400. In addition, or as an alternative, a system may use searching updates 1000 which do not follow the path of a message 400 copy and cannot determine the path taken by a given message 400. These searching updates 1000 are not targeted at a specific message 400 copy, but instead traverse the network 100 searching for corresponding message 400 copies.

When a message 400 copy is found, the searching update 1000 acts on the copy, subject to authentication. If the conditions for disclosure or deletion are met, for instance, the searching update 1000 and/or message 400 copy perform the triggered action; if not, the searching update 1000 moves on to the next node, checks for a message 400 copy, and so on. The searching update 1000 may be implemented using robots, agents, crawlers, or other traveling software tasks that roam the network. The traversal method used by the searching update 1000 should eventually lead it to every location that might harbor a message 400 copy. This may be accomplished using the teachings herein in conjunction with familiar graph search algorithms, for instance.

If the number of locations to search is large, the traversal may take considerable time, so searching updates 1000 are not necessarily the best choice when time is of the essence. However, searching updates 1000 may advantageously make it more difficult to follow an update 1000 directly to a message 400 copy and thereby reduce the risk of unauthorized actions.

In a manner similar to traversal by a searching update, an unauthorized search-and-destroy program could roam the network 100 trying to locate message 400 copies. Accordingly, message 400 copies should be named obscurely and/or be located in obscure places (or in obvious places in file disguised form) so that even if their network node address is known, their existence is not necessarily revealed. Then a search-and-destroy attacker will not necessarily be able to locate the message 400 copies themselves even if the attacker uses the same traversal methods as searching updates 1000 to locate nodes likely to contain message 400 copies.

Tools and techniques used by viruses, worms, Trojan horse programs and the like may be adapted to disguise message 400 copies. In addition, when encrypting a message 400, the message 400 may be reformatted in the guise of a *.c, *.h, *.cpp, *.hpp, *.asm, *.ini, *.DLL, OLE, COM, Java, or other software component or file of a type commonly found on the network 100. Such file disguises include using the appropriate file name extension and other naming conventions for the file type chosen, and may also involve providing the expected internal syntax for the file's contents; hidden information can be placed in a source code file comment, for instance, or in executable code file data sections. Unless a search-and-destroy program is prepared to test both the syntax and the semantics of each file it encounters (and even then risk erroneously deleting a file which is not a message 400), disguising the message 400 copies in this manner will substantially reduce the risk of their unauthorized removal or disclosure.

Of course, the message update 1000 (whether a searching update or otherwise) must be able to identify message 400 copies, so any message update 1000 should be made difficult to capture and difficult to reverse engineer. Capture of a message update 1000 can be made difficult by using a small number of such updates 1000 and by drawing on tools and techniques used by viruses and the like. Message update 1000 reverse engineering can be made difficult by using self-modifying code, time-out loops that detect delays caused by debugger traps and then scramble memory, and other techniques.

In some embodiments, the updates 1000 are sent only to nodes that should also contain a message 400 corresponding to the update 1000. In such cases, it may happen that the expected message 400 is not there. This unexpected omission can be ignored, or it can be reported to a trusted administrator and/or to the information provider.

It may also happen that the update 1000 finds the message 400 at the expected location but a digital signature comparison reveals tampering with the message 400 and/or the update 1000. In such cases, the system may take various actions, according to previously programmed defaults or options specified when the message 400 was stored. For instance, software may raise an alarm by notifying the information provider and/or some other party, or it may disclose the message 400 information earlier than it otherwise would have done.

Additional Message and Update Transmission Considerations

Computers in the system may in general be either servers 102, clients 104, or a mixture of servers and clients. Methods of passing messages 400 and updates 1000 may vary according to whether the sender and transmitter are server or client or a mixture. For instance, agents or servlets or other tasks may be transmitted more readily in some instances while files which are not executable are more readily transmitted in others.

Although the messages 400 and updates 1000 may be implemented using agents, crawlers, servlets, or various forms of traveling program, the transmittals 400, 1000 need not include executable code in every system according to the invention. Some embodiments transmit primarily non-executable messages 400 and updates 1000, while others transmit only non-executable messages 400 and updates 1000. In such embodiments, a task or agent or other local "hidden choir" software resides on each node and performs one or more of the functions discussed above, namely, receiving messages and updates, transmitting messages and/or updates to other nodes, testing disclosure and/or deletion conditions, and carrying out disclosure and/or deletion as indicated.

The local software may be dispersed through the network 100 nodes on an as-need, autonomous basis, that is, without any node knowing the location of every piece of the inventive software. This dispersal may be accomplished in a manner similar to dispersal of executable messages 400 or updates 1000 discussed above in connection with roving messages.

The local software may also be dispersed through the nodes in a centrally managed way, so that a central contract index or other list identifies all nodes (or at least all local networks) which have software in place to receive and manage messages 400 and updates 1000. Naturally, the existence of such a list poses a threat to the continued survival of messages 400 and updates 1000. However, the threat can be reduced by protecting the confidentiality of the list (both its existence and its contents); by making the list of nodes numerous and varied as to platform, entity, and security requirements; by seeding the list with nodes containing tracking software that reports attempted operations to a trusted administrator; by using only a subset of the listed nodes for any given message, thereby raising the cost of unauthorized access attempts forcing any infiltration to attack nodes that contain no messages; and perhaps by other precautions as well.

Summary

In summary, the present invention provides a novel system and method for controlling the disclosure of sensitive information. Copies of the information are hidden throughout a network. Disclosure of the information may be triggered when an expected secrecy renewal does not arrive, indicating that the information provider is in trouble and/or wishes the previously safeguarded information to be released. Disclosure may also be delayed, perhaps indefinitely, unless expressly triggered by the information provider or another authorized user. In short, information is kept secret until specified conditions are met and is then disclosed in a specified manner.

The Figures show a particular order and grouping for method steps of the invention. However, those of skill will appreciate that the steps illustrated and discussed in this document may be performed in various orders, including concurrently, except in those cases in which the results of one step are required as input to another step. Likewise, steps may be omitted unless called for in the claims, regardless of whether they are expressly described as optional here. Steps may also be repeated, or combined, or named differently. Both headings and references to discussions of a given topic elsewhere in the application are for convenience only.

Although particular methods embodying the present invention are expressly illustrated and described herein, it will be appreciated that apparatus, signal, and article embodiments may be formed according to methods of the present invention. For instance, discussion of the message formats 400 illustrates method steps, message signals, and computing systems configured with inventive software to read and write such formats. Unless otherwise expressly indicated, the description herein of methods of the present invention therefore extends to corresponding apparatus, signals, and articles, and the description of apparatus, signals, and articles of the present invention extends likewise to corresponding methods.

Although reference is made to software and/or hardware and/or systems, it will be appreciated that the inventive functionality may be provided by various combinations of one or more of the following: compiled software, interpretable code such as byte codes, fully linked executable code, dynamically loaded libraries, COM or OLE or Java or other components, firmware, microcode, ASICs, PALs, RAM, processors, environment variables, command line parameters, initialization or configuration files, and other software and hardware components, tools, and techniques known in the arts.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method executed by computer(s) for controlling disclosure of sensitive information provided by an information provider, comprising the steps of:

obtaining at least one disclosure condition;

hiding copies of the sensitive information in a network;

checking at least once for occurrence of the disclosure condition; and if occurrence of the disclosure condition is detected then disclosing at least a portion of the sensitive information.

2. The method of claim 1, wherein the sensitive information is hidden by encryption.

3. The method of claim 1, wherein the sensitive information is hidden by a file disguise.

4. The method of claim 1, wherein the hiding step hides at least ten copies of the sensitive information.

5. The method of claim 1, wherein the hiding step hides at least one hundred copies of the sensitive information.

6. The method of claim 1, wherein the hiding step hides at least one thousand copies of the sensitive information.

7. The method of claim 1, wherein the hiding step creates at least one roving message copy.

8. The method of claim 1, wherein the hiding step creates at least one poised message copy.

9. The method of claim 1, further comprising the steps of:

obtaining at least one deletion condition;

checking at least once for occurrence of the deletion condition; and if occurrence of the deletion condition is detected then deleting at least a portion of the sensitive information.

10. The method of claim 9, wherein cancellation by the information provider is a deletion condition, and the user requests such cancellation.

11. The method of claim 1, further comprising the steps of accepting a message update and storing the message update.

12. The method of claim 11, wherein the message update is a searching update which is not directed at a particular copy of the corresponding message to be updated.

13. The method of claim 11, wherein the message update is directed at a particular copy of a corresponding roving message to be updated.

14. The method of claim 11, wherein the message update is directed at a particular copy of a corresponding poised message to be updated.

15. The method of claim 11, wherein at least a portion of the sensitive information is disclosed using at least one destination specified by the information provider.

16. The method of claim 15, wherein a region destination was specified by the information provider and disclosure includes disclosure in that region.

17. The method of claim 15, wherein a deadman switch disclosure condition was specified by the information provider and disclosure is triggered by that condition.

18. The method of claim 1, wherein at least a portion of the sensitive information is disclosed using at least one format specified by the information provider.

19. A computer storage medium having a configuration that represents data and instructions which will cause at least a portion of a computer system to perform method steps for controlled message disclosure, the method steps comprising the steps of:

obtaining at least one disclosure condition;

storing copies of a message in a network;

checking for occurrence of the disclosure condition; and if occurrence of the disclosure condition is detected then disclosing at least a portion of the message.

20. The storage medium of claim 19, wherein the storing step comprises placing a copy of the message in a file disguise.

21. The storage medium of claim 19, wherein the storing step stores at least one thousand copies of the message.

22. The storage medium of claim 19, wherein the storing step stores at least one roving message copy.

23. The storage medium of claim 19, wherein the storing step stores at least one poised message copy.

24. The storage medium of claim 19, wherein the method further comprises the steps of:

obtaining at least one deletion condition;

checking for occurrence of the deletion condition; and if occurrence of the deletion condition is detected then locating copies of the message and deleting all located copies of the message.

25. The storage medium of claim 19, wherein the method further comprises the steps of accepting a message update and storing the message update.

26. The storage medium of claim 19, wherein at least a portion of the message is disclosed to at least one destination.

27. The storage medium of claim 26, wherein disclosure includes sending a copy of at least a sensitive information component of the message to an email destination.

* * * * *